(12) United States Patent
Biere et al.

(10) Patent No.: US 8,254,991 B1
(45) Date of Patent: Aug. 28, 2012

(54) EXTERNAL INTERFACE FOR A MOBILE DEVICE

(75) Inventors: Devon L. Biere, Olathe, KS (US);
Michael A. Gailloux, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1286 days.

(21) Appl. No.: 11/383,571

(22) Filed: May 16, 2006

(51) Int. Cl.
*H04B 1/38* (2006.01)
(52) U.S. Cl. .................. 455/557; 455/418; 455/419
(58) Field of Classification Search .................. 455/557, 455/418, 419; 235/380; 358/1.15; 725/26
See application file for complete search history.

(56) References Cited

U.S. PATENT DOCUMENTS

| | | | |
|---|---|---|---|
| 2002/0054345 A1* | 5/2002 | Tomida et al. | 358/1.15 |
| 2005/0070224 A1* | 3/2005 | Ho et al. | 455/41.2 |
| 2005/0243021 A1 | 11/2005 | Perez et al. | |
| 2005/0262302 A1 | 11/2005 | Fuller et al. | |
| 2007/0067808 A1* | 3/2007 | DaCosta | 725/62 |
| 2008/0290158 A1* | 11/2008 | Ando et al. | 235/380 |

* cited by examiner

*Primary Examiner* — Danh Le

(57) ABSTRACT

A method is provided for interfacing with a mobile device. The method includes presenting the active content of the mobile device in association with an external computing device and receiving, on the mobile device, user input from one or more components associated with the external computing device. A system for interfacing with a mobile device is also provided. The system includes one or more proximity control components, one or more translator components, one or more rendering components, and one or more transferring components. A method for communicating active content of a mobile device to an external computing device is also provided. The method includes transferring data containing at least one of display definitions, navigational elements, and active content and presenting the transferred data in association with the external computing device.

13 Claims, 7 Drawing Sheets

EXTERNAL INTERFACE FOR A MOBILE DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

One of the challenges with using mobile computing devices is the difficulty using the small displays and tiny input components. Likewise, voice activated devices with no display areas can make the initial assignment of voice commands challenging. Tiny thumb keyboards, triple tapping through letters, numbers and symbols, using a stylus to "write", or training the voice recognition software can be frustrating and deter people from fully utilizing their mobile device. Adding to the frustration, most people still spend a significant amount of time near more robust computing devices such as desktop and laptop computers which have easier methods for inputting data and larger display areas. However, these more robust computing devices are not integrated with the mobile device and, accordingly, cannot be used to ease use thereof.

There are software programs like Palm™ Desktop for personal digital assistants, MOBILedit! for cell phones, and iTunes for music players that allow a user to input data on a computer for the mobile device and synchronize the data between the mobile device and the computer. These programs, however, synchronize data in an asynchronous fashion which causes time delays and can complicate the process of keeping data up-to-date on a mobile device. Further, the software on the computing device is preprogrammed to match the specific functionality of the mobile device which requires specific software versions based on the proprietary data formats used by the various mobile devices and frequent software upgrades as the mobile device evolves. Additionally, the software on the computing device has no awareness of the active content of the mobile device and will interrupt any running processes to synchronize. This lack of awareness prevents one from initiating a mobile device function from the computing device.

Accordingly, an improved interface that interacts directly with a mobile device while leveraging the more robust resources of an external computing device without creating synchronization issues would be advantageous. Additionally, a method that allows mobile device users to access the functionality, data and content of the mobile device from a more robust computing device would be desirable.

SUMMARY

The present invention is defined by the claims below. This summary is intended to introduce a selection of concepts in a simplified form that are further described below in the Detailed Description and is not intended to identify key features or essential features of the claimed subject matter, nor is it intended to be used as an aid in determining the scope of the claimed subject matter.

Embodiments of the present invention provide a method for, among other things, interfacing with a mobile device from an external display. Embodiments of the present invention have several practical applications in the technical arts including enabling easier and quicker interaction with mobile devices and simplifying the process of training voice activated mobile devices.

In a first aspect, a method is provided for interfacing with a mobile device. The method includes presenting active content of the mobile device in association with an external computing device and receiving, on the mobile device, user input from one or more components associated with the external computing device.

In another aspect, a system is provided for interfacing with a mobile device. The system includes one or more proximity control components, one or more translator components, one or more rendering components, and one or more transferring components. The translator components are configured for translating native code associated with the mobile device to code enabling display of active content associated with the mobile device on a display device associated with an external computing device. The rendering components are configured for rendering data received from the mobile device to the display associated with the external computing device. The transferring components are configured for transferring the input received from input components associated with the external computing device to the mobile device.

In another aspect, a method for communicating active content of a mobile device to an external computing device is provided. The method includes transferring data containing information associated with at least one of the display definitions associated with the mobile device, one or more navigational elements associated with the mobile device, and the active content of the mobile device, and presenting the transferred data in association with the external computing device.

Aspects of the present invention are further directed to computer-readable media having computer-useable instructions for performing the methods disclosed herein.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
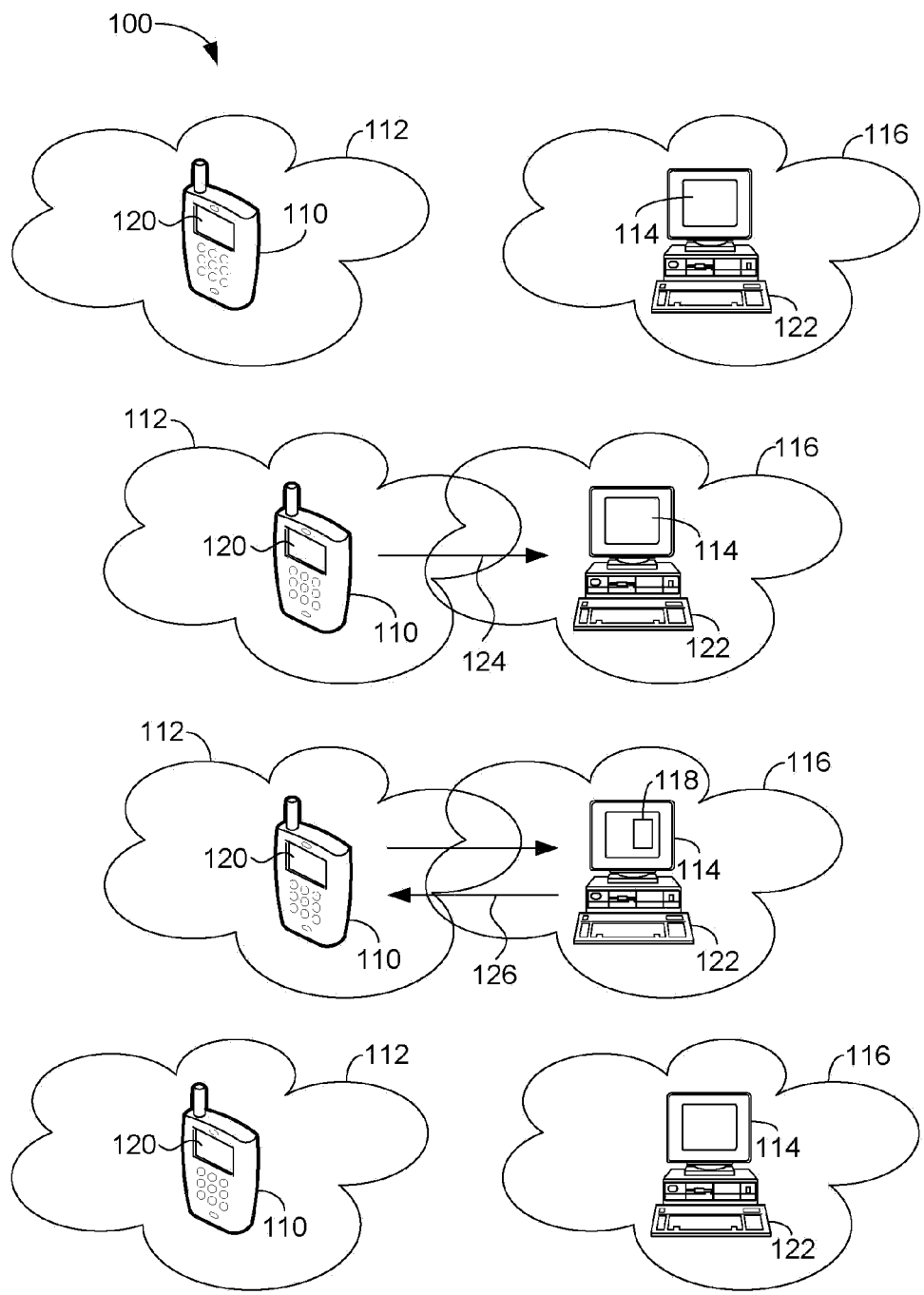
FIG. 1 is a diagram illustrating a method for interfacing with a mobile device on an external computing device in accordance with an embodiment of the present invention.

Embodiments of the present invention provide systems and methods for interfacing with a mobile device utilizing an external computing device. Utilizing the systems and methods described herein, device users can utilize input components from external computing devices to interact with their mobile devices.

Throughout the description of embodiments of the present invention, several acronyms and shorthand notations are used to aid the understanding of certain concepts pertaining to the associated systems and services. These acronyms and shorthand notations are solely intended for the purpose of providing an easy methodology of communicating the ideas expressed herein and are in no way meant to limit the scope of the present invention.

Further, various technical terms are used throughout this description. To the extent a definition is not provided in this specification, a definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

With reference to FIG. 1, a schematic diagram illustrating an exemplary method 100 for interfacing with a mobile device 110 on an external computing device 122 is presented, in accordance with an embodiment of the present invention. In the illustrated embodiment, the mobile device is a mobile phone 110, e.g., a cell phone. It will be understood and appreciated by those of ordinary skill in the art, however, that this embodiment is merely exemplary and that the mobile device may additionally include, without limitation, a personal digital assistant (PDA), an audio player, an audio recorder, a camera, a video player, a video recorder, a television receiver, a radio, a hand-held computing device, and any combination thereof. The mobile phone 110 has a presentation component 120 and a personal area network 112 associated therewith. In the illustrated embodiment, the presentation component 120 is a display as, typically, presentation of data (as more fully described below) comprises displaying the data. However, other types of presentation, such as an audible presentation, may also be provided within the scope of embodiments of the present invention. As such, presentation component 120 may comprise, for instance, an audio presentation component. The personal area network 112 may be a broadcast range or connection method associated with a communication protocol. A "communication protocol", as utilized herein, includes any wireless or wired protocol which enables data transmission and/or reception. Such communication protocols include, but are not limited to, Bluetooth, Infrared, Wi-Fi, Wi Max, ZigBee, USB, and Firewire.

In the illustrated embodiment, the external computing device is a desktop computer 122. The desktop computer 122 has a personal area network 116 and a presentation component 114, in this case a display, associated therewith. As with the personal area network 112 associated with the mobile phone 110, the personal area network 116 associated with the desktop computer 122 may be a broadcast range or connection method associated with a communication protocol.

In the illustrated embodiment, as the personal area network 112 associated with the mobile phone 110 and the personal area network 116 associated with the desktop computer 122 are brought within proximity of one another, a verification protocol 124 is initiated that determines whether the mobile device user is registered to use the presentation and input capabilities of the desktop computer 122. If it is determined that the mobile device user is registered to use the presentation and input capabilities of the desktop computer 122, data is subsequently transmitted between the mobile phone 110 and the desktop computer 122 which enables the active content of the mobile phone display 120 to be presented on the desktop computer display 114 via an external user interface 118. "Active content", as utilized herein, refers to any data or information currently presented by or on the mobile device and may include, by way of example only, data, data fields, video, audio, navigational elements, and components configured for executing functions associated with the mobile device 110.

The mobile phone display 120 and external interface 118 may present identical information where the active content on both displays is the same, as more fully described below with reference to FIG. 2. Alternatively, the external interface 118 may display enhanced features, including, but not limited to, any data, information, or functions that are not currently presented by or on the mobile device 110, but which are available in association with either the mobile device 110 or the external computing device 122. This embodiment is more fully described below with reference to FIG. 3. If the mobile phone display 120 is altered due to input received from components associated with the mobile phone 110, the external interface 118 is essentially simultaneously changed accordingly utilizing a dynamic communication exchange 126.

Once the personal area network 112 associated with the mobile phone 110 and the personal area network 116 associated with the desktop computer 122 are no longer within proximity of one another, the communication exchange 126 is disconnected and the session is terminated. One skilled in the art can appreciate that a session could also be terminated manually by a user invoking a command on either the mobile phone 110 or the desktop computer 122.

Figure 2:
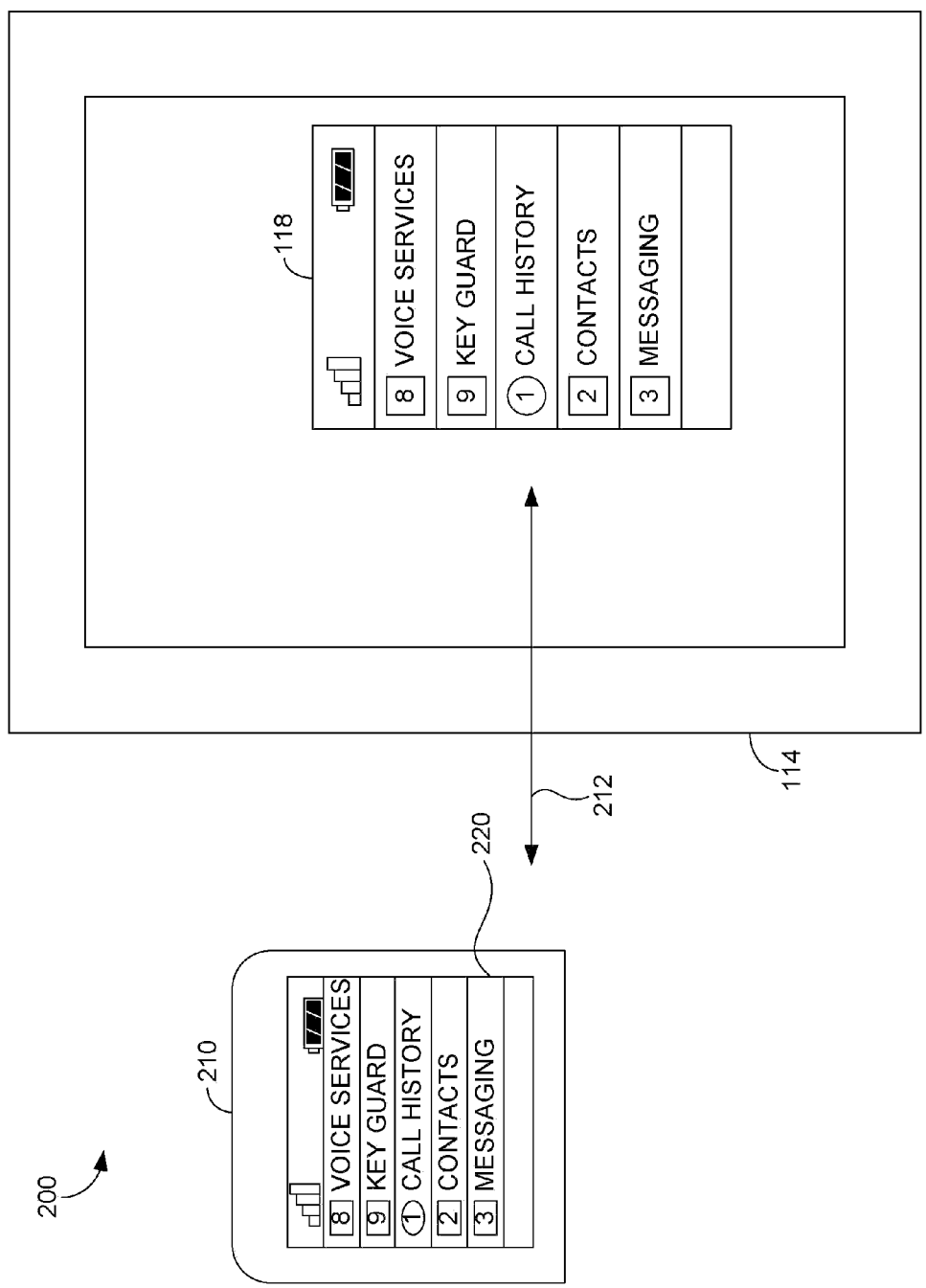
FIG. 2 is a diagram illustrating the active content of a mobile device displayed on an external computing device in accordance with an embodiment of the present invention.

With reference to FIG. 2, a diagram 200 is illustrated which shows the active content of a mobile device identically displayed on the presentation component 114 of an external computing device. As previously stated, active content may be any data or information currently presented by or on the mobile device including, but not limited to, data, data fields, video, audio, navigational elements, and components configured for executing functions associated with the mobile device. In the illustrated embodiment, the mobile device display 210 depicts a menu 220 of options available on the mobile device. The external computing device display 114 presents an external interface 118 which includes identical information to that displayed on the mobile device. The data needed to load and update both the mobile device display 220 and the external interface 118 is communicated dynamically through the communication protocol 212. The communication protocol may be any wireless or wireline protocol which enables data transmission and/or reception.

Figure 3:
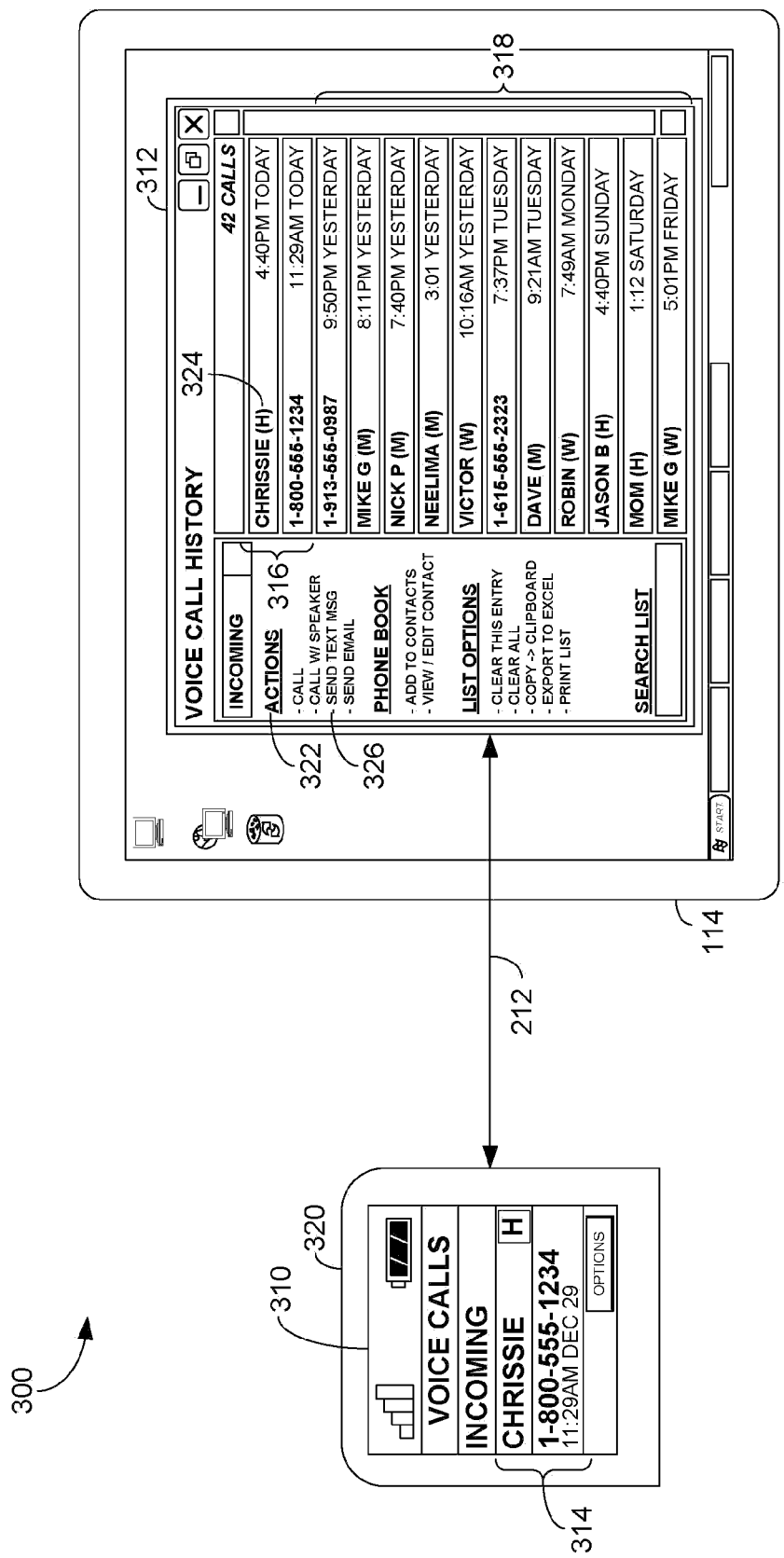
FIG. 3 is a diagram illustrating the active content of a mobile device displayed in an enhanced mode on an external computing device in accordance with an embodiment of the present invention.

Turning now to FIG. 3, a diagram 300 is illustrated which shows the active content 314 of a mobile device 320 and one or more enhanced features displayed on the presentation component 114 of an external computing device. In the illustrated embodiment, the active content 314 of the mobile device display 310 includes a list of incoming voice calls. The external computing device display 114 presents an external interface 312 which contains the same active content 314 as the mobile device display 310 but also includes enhanced features. The active content 314 of the mobile device display 310 in the illustrated embodiment includes two incoming call records and is displayed on the external interface 312 at reference numeral 316. In the illustrated embodiment, the enhanced features include additional data represented by the eleven additional incoming call records displayed at 318, and navigational elements and components configured to execute functions on the mobile device displayed at 322.

By way of example, the user could use a mouse associated with the external computing device to click on the incoming call record displayed at 324 then click on the 'send text message' component 326, This would result in the mobile device 320 initiating the text messaging procedures for that mobile device 320 using data associated with that incoming call record. In this example, as the display 310 associated with the mobile device 320 changes, so would the external interface 312 associated with the external computing device. The subsequently displayed information on the mobile device 320 may include a data entry field for inputting the body of the text message. That field would be displayed on both the mobile device display 310 and the external interface 312 associated with the external computing device giving the user the ability to enter the text message using input components associated with either the external computing device 300 or the mobile device 320. The data needed to load and update both the display 310 associated with the mobile device 320 and the external interface 312 associated with the external computing device 300 is communicated dynamically through the communication protocol 212. As previously stated, the communication protocol may be any wireless or wireline protocol which enables data transmission and/or reception.

Figure 4:
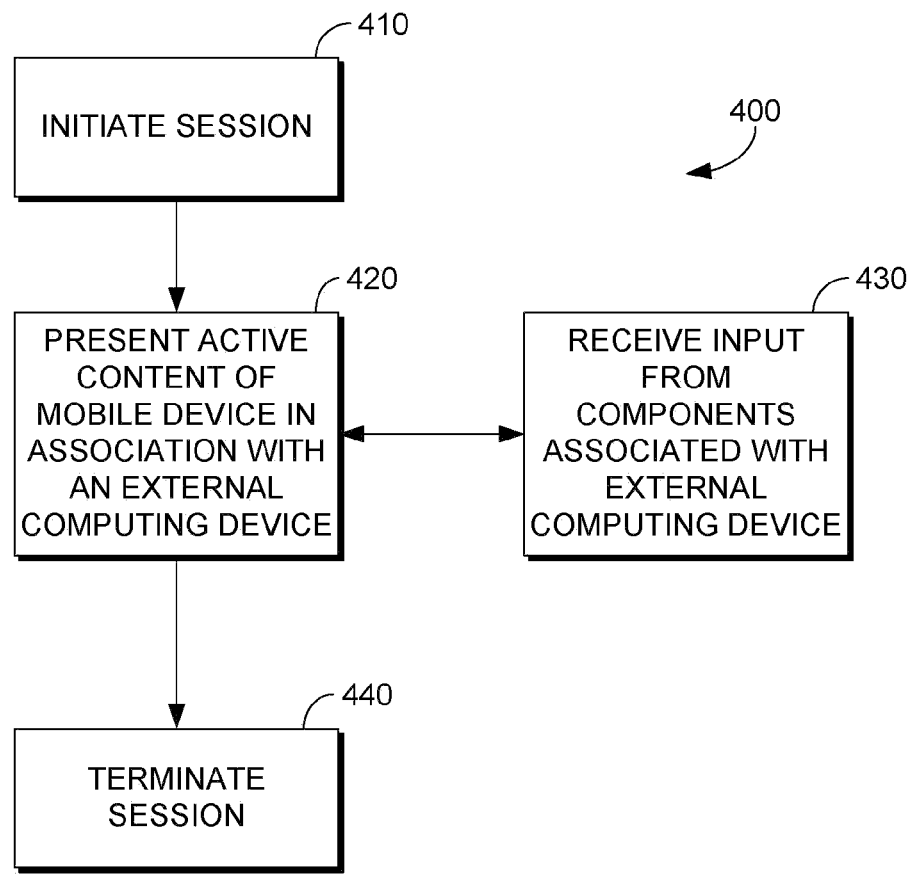
FIG. 4 is a flow diagram illustrating a method for displaying the interface of a mobile device on an external computing device in accordance with an embodiment of the present invention.

Turning now to FIG. 4, a flow diagram is shown illustrating a method 400 for presenting the active content of a mobile device in association with an external computing device in accordance with an embodiment of the present invention. The session is initiated at 410. In one embodiment, a session may be initiated upon the mobile device coming into proximity with the external computing device. In another embodiment, a session may be initiated by physical wire or cable coupling of the external computing device to the mobile device. Any and all combinations thereof are contemplated to be within the scope of embodiments of the present invention. One of ordinary skill in the art will recognize that, if desired, the session initiation process may include security measures such as password protection and other ways known in the art to create secure connections between diverse devices.

Once the session is initiated, the active content of the mobile device is presented in association with the external computing device at 420. Once the active content of the mobile device is presented, the mobile device can receive input from components associated with the external computing device. This is indicated at 430. Such components may include, but are not limited to, a keyboard, a mouse, a screen, a microphone, a stylus, a light pen, a removable memory, and a software application. The presenting step 420 and the receiving step 430 are repeated as needed and create a dynamic real-time exchange between the mobile device and the external computing device until the session is terminated at 440. Termination could also occur by moving the mobile device out of the proximity allowed by the wireless communication protocol, by disconnecting the wired connection, by the user selecting a command on either the mobile device or external interface, by timing out, or any other termination method known in the art.

Figure 5:
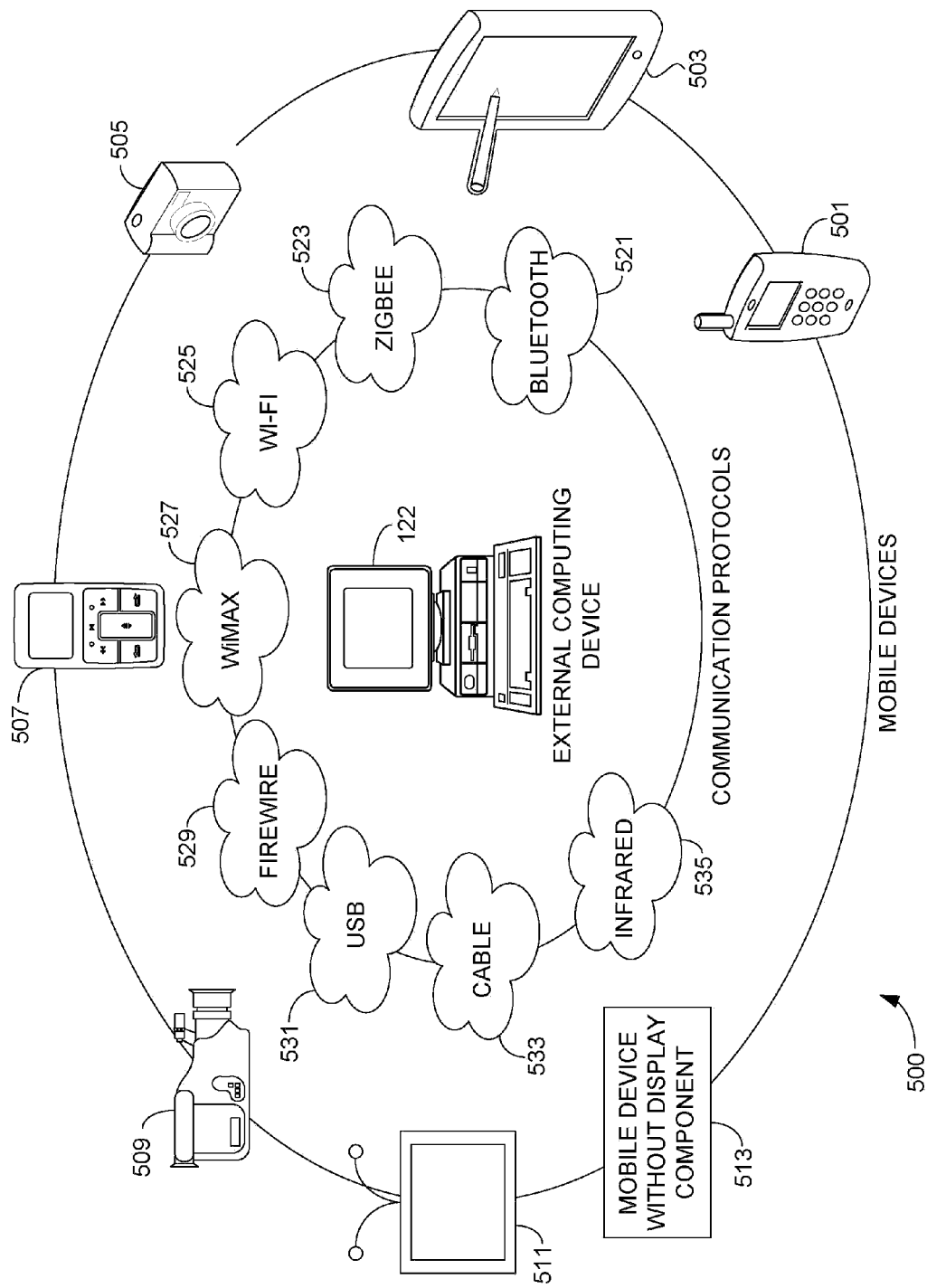
FIG. 5 is a schematic diagram of an exemplary interworking of mobile devices and connection protocols when implementing an embodiment of the present invention.

With reference now to FIG. 5, a schematic diagram 500 of an exemplary interworking between various mobile devices and communication protocols is shown. The illustrated mobile devices include a mobile phone 501, a personal digital assistant 503, a digital camera 505, a music player/recorder 507, a video player/recorder 509, a video/audio broadcast receiver 511, and a mobile device without a display component 513. The illustrated communication protocols used to create the external interface on the external computing device 122 are shown by a Bluetooth 521, ZigBee 523, WiFi 525, WiMax 527, Firewire 529, USB 531, Cable 533, and infrared 535. These communications protocols or any other protocol capable of data transmission and/or reception between diverse computing devices can be used to practice embodiments of the present invention. The external computing device 122 is represented by a desktop computer, but one skilled in the art can appreciate that it could be any computing device capable of executing computer-usable instructions including, but not limited to, a laptop or hand-held computer or another mobile device.

Figure 6:
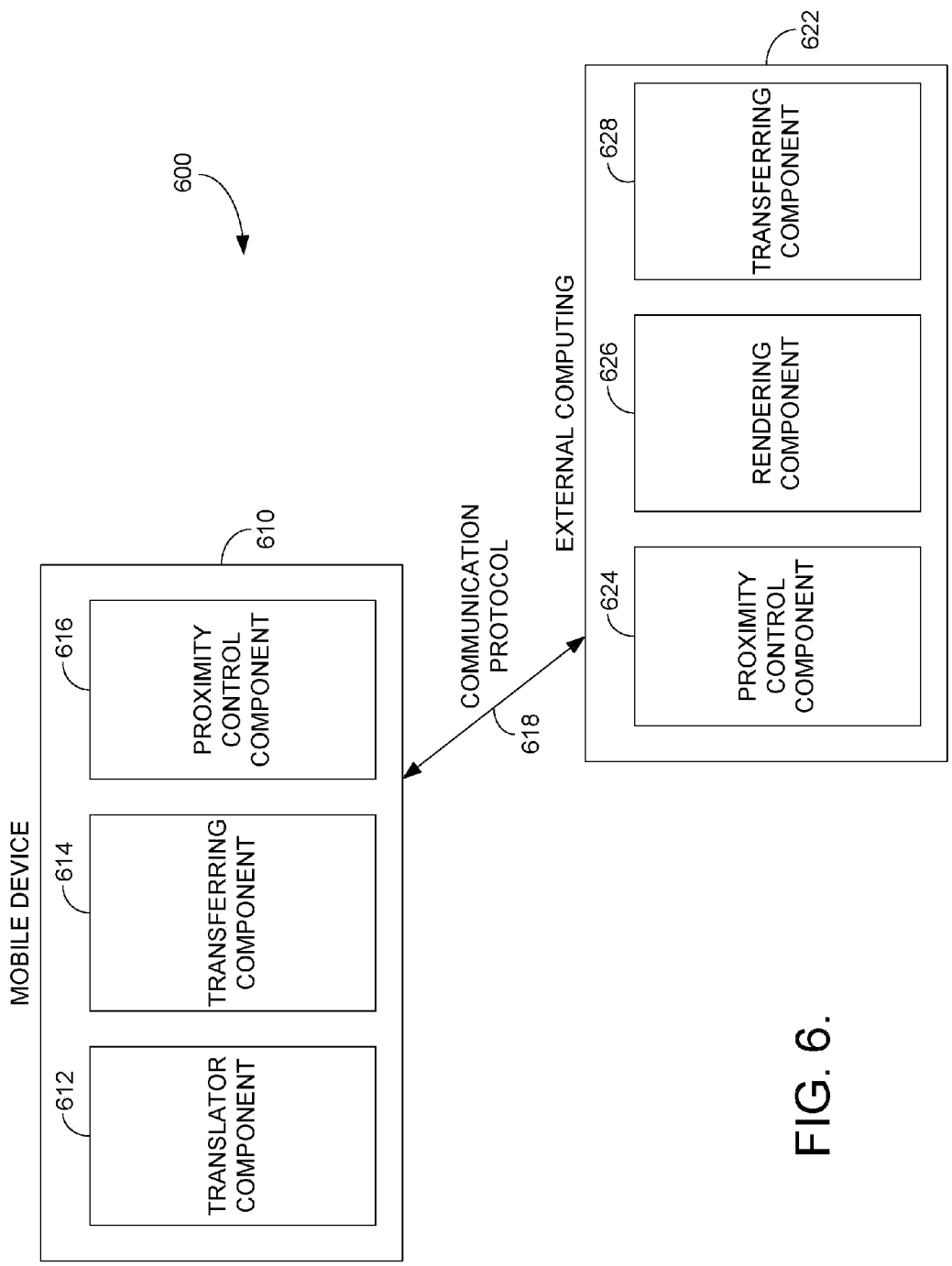
FIG. 6 is a block diagram illustrating a system for interfacing with a mobile device via an external display in accordance with an embodiment of the present invention.

Turning now to FIG. 6, a block diagram is shown illustrating a system 600 for interfacing with a mobile device 610. The mobile device 610 includes a translator component 612, a transferring component 614, and a proximity control component 616. The translator component 612 is configured for translating the native code associated with the mobile device 610 to code that enables the presentation of the active content of the mobile device on or in association with the external computing device 622. The translator component 612 may also be configured for translating the code received from the external computing device 622 back to native code usable by the mobile device 610. The transferring component 614 of the mobile device 610 is configured to transfer and/or receive data from the communication protocol 618. The proximity control component 616 is configured to manage the initiation and termination of the communication protocol 618 between the mobile device and the external computing device 622.

The external computing device 622 includes a proximity control component 624, a rendering component 626, and a transferring component 628. The proximity control component 624 of the external computing device 622 is similar to the proximity control component of the mobile device 610 and is configured to manage the initiation and termination of the communication protocol 618 between the external computing device 622 and the mobile device 610. The transferring component 628 associated with the external computing device 622 is configured to transfer and receive data from the communication protocol 618. The rendering component 626 associated with the external computing device 622 is configured to render the data received from the communication protocol 618 to a display or other presentation component associated with the external computing device 622. The communication protocol 618 may be any wireless or wireline protocol which enables data transmission and/or reception.

Figure 7:
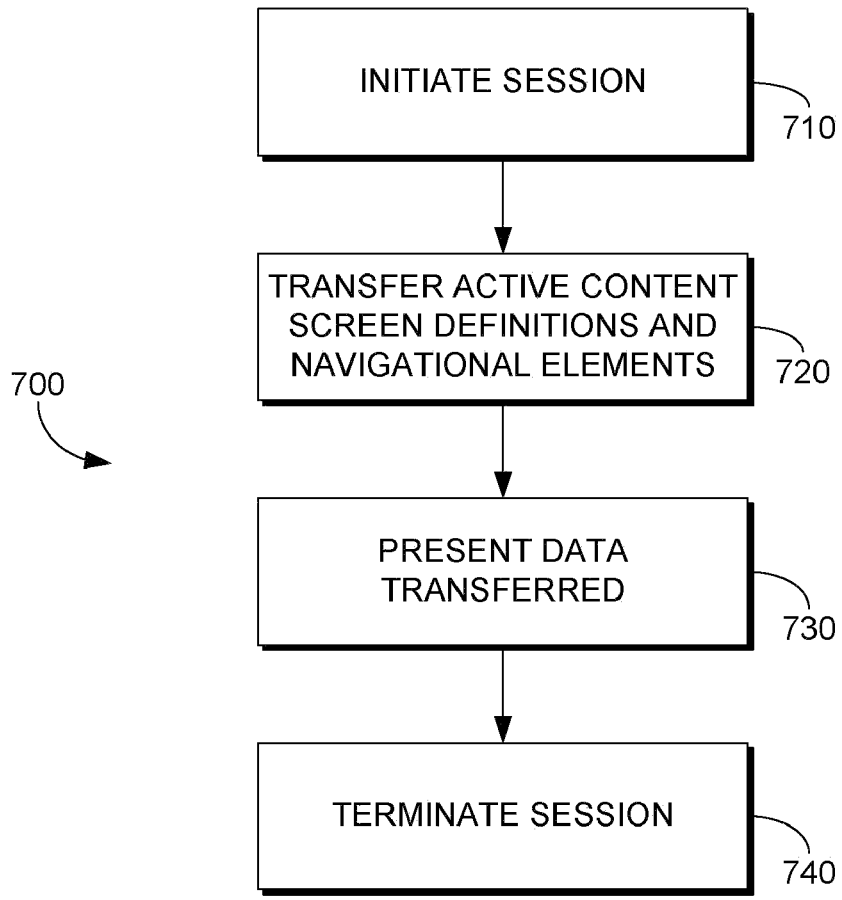
FIG. 7 is a flow diagram illustrating a method for communicating active content of a mobile device to an external computing device in accordance with an embodiment of the present invention.

With reference to FIG. 7, a flow diagram is shown illustrating an exemplary method 700 for communicating active content associated with a mobile device to an external computing device in accordance with an embodiment of the present invention. Initially, the session is initiated at 710. As with the embodiment illustrated in FIG. 4, a session may be initiated upon the mobile device coming into proximity with the external computing device or by physical wire or cable coupling of the external computing device to the mobile device. One of ordinary skill will appreciate that the session initiation process may, if desired, include security measures such as password protection and other procedures known in the art to create secure connection between diverse devices. Once the session is initiated, the active content, screen definitions, and navigational elements associated with the mobile device are transferred at 720 by the mobile device to the external computing device. Once the data is transferred, it is presented in association with the external computing device at 730. The transfer step 720 and presenting step 730 are repeated as needed and create a dynamic exchange between the mobile device and the external computing device until the session is terminated at 470. Termination could occur by moving the mobile device out of the proximity allowed by the wireless communication protocol, by disconnecting the wired connection, by the user selecting a command on either the mobile device or the external interface, by timing out, or any other termination method known in the art.

Many different arrangements of the various components depicted, as well as components not shown, are possible without departing from the spirit and scope of embodiments of the present invention. Embodiments of the present invention have been described with the intent to be illustrative rather than restrictive. Alternative embodiments will become apparent to those skilled in the art. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method in a computerized environment for interfacing with a mobile device, the method comprising:
    presenting to a user in real-time and on a first presentation component of an external computing device, dynamic active content currently presented in association with the mobile device, wherein the first presentation component is not directly associated with the mobile device, wherein the dynamic active content is received by the external computing device from the mobile device, and wherein the dynamic active content presented on the first presentation component of the external computing device changes as the active content currently presented in association with the mobile device changes; and
    receiving user input at the mobile device from one or more input components directly associated with the external computing device, wherein the one or more input components is not directly associated with the mobile device.

2. The method of claim 1, wherein the dynamic active content comprises content displayed or presented on a second presentation component, the second presentation component being directly associated with the mobile device and not directly associated with the external computing device.

3. The method of claim 2, wherein the content displayed or presented on the second presentation component includes one or more of data, data fields, video, audio, navigational elements, and components configured for executing functions associated with the mobile device.

4. The method of claim 1, wherein the dynamic active content comprises content presented on a second presentation component, the second presentation component being directly associated with the mobile device and not directly associated with the external computing device, and one or more enhanced features.

5. The method of claim 4, wherein at least one of the one or more enhanced features includes one or more of additional data, additional data fields, additional navigational elements, and additional components configured to execute functions associated with the mobile device.

6. The method of claim 1, wherein the active content comprises a user interface for the mobile device.

7. The method of claim 1, wherein the mobile device comprises one of: a mobile phone, a personal digital assistant, an audio player, an audio recorder, a camera, a video player, a video recorder, a television receiver, a radio, a media player, and a hand-held computing device.

8. The method of claim 1, wherein at least one of the one or more input components associated with the external computing device and the first presentation component comprises one or more of a keyboard, a mouse, a screen, a microphone, a stylus, a light pen, a removable memory, and a software application.

9. A method in a computerized environment for communicating active content of a mobile device to an external computing device, the method comprising:
    transferring data containing information associated with at least one of one or more display definitions associated with the mobile device, one or more navigational elements associated with the mobile device, and the active content currently presented in association with the mobile device to the external computing device, wherein the mobile device is in continued communication with the external computing device, and wherein the active content is transferred from the mobile device to the external computing device for presentation; and presenting the data transferred to the external computing device on a first presentation component, wherein the first presentation component is directly associated with the external computing device and not directly associated with the mobile device, and wherein the active content presented on the first presentation component of the external computing device is dynamic and changes as the active content presented in association with the mobile device changes.

10. The method of claim 9, wherein the active content comprises content displayed on a second presentation component, the second presentation component being directly associated with the mobile device and not directly associated with the external computing device.

11. The method of claim 9, wherein the active content comprises content presented on a second presentation component, the second presentation component being directly associated with the mobile device and not directly associated with the external computing device, and one or more enhanced features.

12. The method of claim 9, wherein the active content comprises a user interface for the mobile device.

13. The method of claim 9, wherein the mobile device comprises one of a cell phone, a personal digital assistant, an audio player, an audio recorder, a camera, a video player, a video recorder, a television receiver, a radio, and a hand-held computing device.

* * * * *